(12) United States Patent
Hofmann et al.

(10) Patent No.: US 6,772,254 B2
(45) Date of Patent: Aug. 3, 2004

(54) MULTI-MASTER COMPUTER SYSTEM WITH OVERLAPPED READ AND WRITE OPERATIONS AND SCALABLE ADDRESS PIPELINING

(75) Inventors: Richard Gerard Hofmann, Apex, NC (US); Jason Michael Hopp, Apex, NC (US); Peter Dean LaFauci, Holly Springs, NC (US); Dennis Charles Wilkerson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 09/855,831

(22) Filed: May 15, 2001

(65) Prior Publication Data

US 2002/0062414 A1 May 23, 2002

(Under 37 CFR 1.47)

Related U.S. Application Data (60) Provisional application No. 60/213,040, filed on Jun. 21, 2000.

(51) Int. Cl.[7] ........................ G06F 13/14; G06F 13/362
(52) U.S. Cl. ........................ 710/110; 710/113; 710/305
(58) Field of Search ........................ 710/107–125, 710/305; 711/169

(56) References Cited

U.S. PATENT DOCUMENTS

| | | | |
|---|---|---|---|
| 4,626,843 A | 12/1986 | Szeto et al. | 340/825.5 |
| 5,440,751 A | 8/1995 | Santeler et al. | 395/800 |
| 5,469,544 A | 11/1995 | Aatresh et al. | 395/290 |
| 5,553,248 A | 9/1996 | Melo et al. | 395/296 |
| 5,555,425 A | 9/1996 | Zeller et al. | 395/800 |
| 5,640,527 A | 6/1997 | Pecone et al. | 395/405 |
| 5,699,516 A | 12/1997 | Sapir et al. | 395/200.01 |
| 5,768,559 A | * 6/1998 | Iino et al. | 711/157 |
| 5,784,636 A | * 7/1998 | Rupp | 712/37 |
| 5,809,552 A | * 9/1998 | Kuroiwa et al. | 711/169 |
| 6,081,860 A | 6/2000 | Bridges et al. | 710/110 |

OTHER PUBLICATIONS

Tom R. Halfill, PowerPC 405GP Has CoreConnect Bus, Microprocessor Report, vol. 13, No. 9, pps. 1–2, Jul. 12, 1999.

08/731,350, entitled "Method and Apparatus for Control of speculative Memory Accesses", filed__, now USP__.

* cited by examiner

*Primary Examiner*—Sumati Lefkowitz
(74) *Attorney, Agent, or Firm*—Morgan & Finnegan; J. Cockburn (57) ABSTRACT

A multi-master computer system having overlapped read and write signal with scalable address pipelining programmable increases the depth of address pipelining independently on two overlapped read and write data busses up to "N" deep requests. The system includes a local bus having an address bus, a read bus, and a write bus. Master devices are coupled to separate address, read data and write data buses. Slave devices are attached to the data busses through shared, but decoupled address, read and write data buses. An arbiter is coupled to the data bus and allows masters to compete for bus ownership. The arbiter includes read and write pipeline logic for processing and priortizing master and slave read and write data transfers across the data bus. Programming apparatus alters the read and write pipeline logic for address pipelining

34 Claims, 8 Drawing Sheets

FIG. 1
PLB Interconnect Diagram

FIG. 2
PLB Address and Data Cycles

FIG. 3
Overlapped PLB Transfers

FIG. 4

FIG. 5
Read Pipeline Logic

FIG. 5A

Four Deep Pipelining State Diagram

FIG. 6
Master Pipe Logic

FIG. 7
Slave Pipe Logic

FIG. 8
Priority Pipe Logic

FIG. 9
Four Deep Read Pipelining

FIG. 10

Four Deep Write Pipelining

MULTI-MASTER COMPUTER SYSTEM WITH OVERLAPPED READ AND WRITE OPERATIONS AND SCALABLE ADDRESS PIPELINING

PRIORITY INFORMATION

This application claims priority from U.S. Provisional Application Serial No. 60/213,040 filed Jun. 21, 2000, entitled "Scalable Address Pipelining on Busses of Computer Systems" and assigned to the same Assignee as the present invention.

BACKGROUND OF INVENTION

1. Field of Invention

This invention relates to information processing systems, methods of operation and program products. More particularly, the invention relates to Processing Local Bus (PLB) architecture for multi-master and slave data transfers with overlapped read/write operations and scalable address pipelining: systems, methods and program products.

2. Description of Prior Art

Microprocessor based system central processing units and other bus masters require access to main memory locations. Main memory is typically distanced from the masters by at least one level of bridging between the masters and the memory bus. This bridging function is accomplished via a memory controller. The memory controller can be a sophisticated mechanism capable of accepting and ordering several different memory operations at any given moment in time. One of the problems associated with memory control is the initial memory latency inherent with dynamic random access memory, or DRAM. From the time that a master or CPU initiates a read request to main memory until the data is returned can be well over a dozen bus clock cycles. This latency negatively affects the overall system performance. To counteract the latency effect on reads to main memory the concept of "address pipelining" was introduced whereby the master would present a subsequent pending read request to the memory controller prior to completion of a preceding read operation. In this way the memory controller could better order and schedule use of the memory bus to decrease overall latency on subsequent pending reads. Also, other devices attached to the bus could claim operations destined for them in the future and allocate resources so that their initial latency is reduced. Further arbitration cycles, which use to operate sequentially with read and write transfers may now be performed in parallel with previous transfer requests in progress. What is needed in the art is a scalable address pipelining mechanism in a PLB architecture which can be used to programmably increase the depth of address pipelining independently on two overlapped read and write data buses while one operation is being performed and another operation is being performed at the same time.

Prior art related to address pipelining includes:

1. U.S. Pat. No. 6,081,860 entitled "Address Pipelining for Data Transfer," issued Jun. 27, 2000 filed Nov. 20, 1997 discloses a process and system for transferring data including at least one slave device connected to at least one master device through an arbiter device. The master and slave devices are connected by a single address bus, a write data bus and a read data bus. The arbiter device receives requests for data transfers from the master devices and selectively transmits the requests to the slave devices. The master devices and the slave devices are further connected by a plurality of transfer qualifier signals, which may specify predetermined characteristics of the requested data transfers. Control signals are also communicated between the arbiter device and the slave devices to allow appropriate slave devices to latch addresses of requested second transfers during the pendency of current or primary data transfers so as to obviate an address transfer latency typically required for the second transfer. The design is configured to advantageously function in mixed systems, which may include address-pipelining and non-address-pipelining slave devices.

2. U.S. Pat. No. 4,626,843 entitled "Multi-Master Communication Bus System with Parallel Bus Request Arbitration" issued Dec. 2, 1986 discloses apparatus and a related method for regulating access to a communication bus to which multiple communication nodes are connected. Control logic at each of the nodes determines which of them has priority to access the bus, by means of a parallel arbitration sequence in which all nodes contending for bus access participate. Specifically, each contending node generates a relative priority node number and asserts it onto an arbitration bus. All of the asserted node numbers are logically combined into a composite node number on the bus, and the winning node is determined in a bit-by-bit ripple comparison circuit at each node, the composite node number being compared with the locally generated relative priority node number. Priority is determined in advance of data transmission, and synchronization and arbitration take place without any central or master control unit.

3. U.S. Pat. No. 5,555,425 entitled "Multi-Master Bus Arbitration System in Which the Address and Data Lines of the Bus May Be Separately Granted to Individual Masters," issued Sep. 10, 1996 discloses a multi-master digital computer system has a bus, a plurality of master devices connected to the bus, a plurality of slave devices connected to the bus, and a bus controller for arbitrating bus requests by the master devices and for granting the bus to a selected one of the plurality of the master devices. Each master device is capable of originating a bus cycle to transmit data to or receive data from a desired slave device. The bus controller grants the bus to a selected master device, which enters an address master state and addresses the desired slave device. The selected master device is transferred to a bus master state where a data transfer to or from the slave device is initiated. The selected master device then transfers to a data master state unless the selected master device wants, and is permitted through an arbiter, to retain control of the bus. The bus controller grants a bus request to a requesting master device through to the arbiter. The requesting master device is transferred into the address master state while the selected master device is still in the data master state, thus performing a pipelining operation.

4. U.S. Pat. No. 5,640,527 entitled "Apparatus & Method for Address Pipelining of Dynamic Random Access Memory Utilizing Transparent Page Address Batches to Reduce Wait States," issued Jun. 17, 1997 discloses An apparatus and method for address pipelining of a computer system that reduce the average number of wait states required to access a dynamic random access memory (DRAM) subsystem. A memory controller addresses a plurality of random access memory integrated circuits in pages of addresses wherein contiguous address pages are in different ones of the plurality of dynamic random access memory integrated circuits. Transparent latches associated with each of the different ones of the plurality of dynamic random access memory integrated circuits allow pipelining of address setups for more than one memory page at substantially the same time. The apparatus and method improve the write access times of a computer system and, when used with a computer system having address pipelining, both read and write accesses are improved because address set up latency time is reduced.

5. U.S. Pat. No. 5,699,516 entitled "Method & Apparatus for Implementing In-Order Termination Bus Protocol Within a Data Processing System," issued Dec. 16, 1997 discloses a bus protocol is provided for pipelined and/or split transaction buses (18,48) which have in-order data bus termination and which do not require data bus arbitration. The present invention solves the problem of matching the initial address request by a bus master (12, 13, 42) to the corresponding data response from a bus slave (14, 15, 44) when the bus (18, 48) used for master-slave communication is a split-transaction bus and/or a pipelined bus. Each bus master (12, 13, 42) and each bus slave (14, 15, 44) has a counter (30–33, 75–76) which is used to store a current pipe depth value (21, 51) from a central pipe counter (16, 72). A transaction start signal (20, 50) and a transaction end signal (22, 52) are used to selectively increment and decrement the counters (30–33, 75–76).

6. U.S. Pat. No. 5,440,751 entitled "Burst Data Transfer to Single Cycle Transfer Conversion and Stroke Single Conversion," issued Aug. 8, 1995 discloses an apparatus, which converts burst mode bus, cycles into single cycle mode cycles and converts separate address and data strobe signals into a single address strobe in a computer system. The apparatus also receives an address strobe signal, a number of address signals and the length of the burst when a device begins a burst cycle. After the first cycle of the burst transfer is complete, the apparatus initiates each subsequent cycle comprising the burst transfer by incrementing the address signals and providing additional address strobe signals until the burst is complete. The logic also facilitates address pipelining by monitoring a next address signal generated by the device. The apparatus monitors the separate address strobe and data strobe signals and generates the single address strobe signal on the next clock cycle after the address and data strobe signals are asserted. If only the address strobe signal is asserted at the beginning of a cycle, then the single address strobe signal is asserted only after valid data is available on the bus and the data strobe signal is asserted. The apparatus also monitors next address signals generated by the device to facilitate pipelining 7. U.S. Pat. No. 5,469,544 entitled "Central Processing Unit Address Pipelining," issued Nov. 21, 1995 discloses a microprocessor for use in a computer system which pipelines addresses for both burst and non-burst mode data transfers. By pipelining addresses, the microprocessor is able to increase the throughput of data transfers in the system. In the present invention, bits are used which may be programmed to disable and enable the address pipelining for the non-burst mode and burst mode transfers.

8. U.S. Pat. No. 5,553,248 entitled "System for Awarding the Highest Priority to a Microprocessor Releasing a System Bus after Aborting A Locked Cycle upon Detecting A Locked Retry Signal" issued Sep. 3, 1996 discloses three prioritization schemes for determining which of several CPUs receives priority to become bus master of a host bus in a multiprocessor system, and an arbitration scheme for transferring control from one bus master to another. Each prioritization scheme prioritizes n elements, where a total of (n/2)×(n−1) priority bits monitors the relative priority between each pair of elements. An element receives the highest priority when each of the n−1 priority bits associated with that element points to it. In the arbitration scheme, the current bus master of the host bus determines when transfer of control of the host bus occurs as governed by one of the prioritization schemes. The arbitration scheme gives EISAI bus masters, RAM refresh and DMA greater priority than CPUs acting as bus masters, and allows a temporary bus master to interrupt the current bus master to perform a write-back cache intervention cycle. The arbitration scheme also supports address pipelining, bursting, split transactions and reservations of CPUs aborted when attempting a locked cycle. Address pipelining allows the next bus master to assert its address and status signals before the beginning of the data transfer phase of the next bus master. Split transactions allow a CPU posting a read to the EISAI bus to arbitrate the host bus to another device without re-arbitrating for the host bus to retrieve the data. The data is asserted on the host bus when it is idle even if the host bus is being controlled by another device.

None of the prior art discloses a multi-master computer system with overlapped read and write signal and scalable address pipelining to programmably increase the depth of address pipeling independently on two overlapped read and write data busses up to "N" deep request pipelining, the read and write pipeline depths being programmable to different values and providing information to masters of the highest priority request contained in both the read and write pipelines enabling the masters to determine the relative importance of pending transfer requests thereby permitting appropriate action during long burst transfers.

SUMMARY OF INVENTION

An object of the invention is an information processing system, method of operation and program product having scalable address pipelining which programmably increases the depth of address pipelining independently on overlapped read and write data busses of a multi-master computer system for reduced system latency.

Another object is a multi-master computer system, method, and program product providing information to masters of the highest priority request contained in both read and write pipelines of pending transfer requests.

Another object is a Processor Local Bus Architecture which provides programming of a number of addresses pipelined up to "N" deep requests where read and write pipeline depths may be programmed to different values.

These and other objects, features and advantages are achieved in a multi-master computer system, e.g. a Local Processing Bus (LPB) architecture for multi-Master and Slave data transfers with overlapped Read and Write operations and scalable address pipelining. The system includes a plurality of Master (CPU)devices and Slaves peripheral devices) connected to the LPB having address, read and write busses serviced by a PLB Arbiter. The Arbiter includes scalable Read Master pipeline logic for storing 0 to "N" read master identifications (Ids) corresponding to requests according to the order of the master bus grant; Read Slave pipeline logic for storing 0 to "N" Slave Ids acknowledging Read Master requests; Read priority pipeline logic for tracking master request priority involved in each pipe line transfer; scalable Write Master pipeline logic for storing O to "N" write Master (Ids) corresponding to requests and according to the order of the Master bus grant producing the highest priority in the pipeline request; Write Slave pipeline logic for storing 0 to "N" Slave Ids acknowledging Master Write requests, and Write Priority pipeline logic for tracking of Write request priority of Master devices according to the order of the bus grant producing the highest priority in the pipeline produce the highest priority of the Read or Write Master request to the bus or other Masters. A state machine controls the shifting of data transfer requests in the pipeline logic. To achieve scalable pipeline operation, the Arbiter samples each Slave Address Acknowledge (S1_addrAck) signal independently up to the number of Slaves supported. The Arbiter also provides a separate Read primary (PLB_rdPrim) and Write primary (PLB_wrPrim) signal to each Slave to notify the one and only one Slave positioned in the pipeline that has been promoted to the primary transfer. The means for broadcasting all pipeline transfers is via a Secondary Address Valid (PLB_SA Valid) signal. For a particular type of transfer, Read or Write, each subsequent assertion of the Secondary Address Valid signal by the Arbiter without an intervening assertion of a Primary Address Valid (PLB_PA Valid) signal is considered an increase in the depth of pipelining. A master receives an address acknowledge signal from the arbiter which routed the address acknowledge from the slave and awaits the appropriate data acknowledgement. A slave acknowledges a pipeline transfer without concern for its position in the pipeline. The master may request additional pipeline requests for the same bus as long as it continues to receive arbiter address acknowledgement assertions. The slave may or may not acknowledge subsequent assertions of the arbiter secondary address valid signal so as to claim as many pipeline transfers as possible. There is no bus timeout for a pipeline transfer for a slave which cannot acknowledge a secondary request in a reasonable amount of time. In such case the slave asserts a rearbitrate transfer (SL_rearbitrate) signal to allow the arbiter to advance to the next pending bus request. Separate read pending requests (PLB_rdPendReq) signals and write pending requests (PLB_wrPendReq) signals by the arbiter are available for sampling by the bus master. If a master request (Mn_request) is active or a secondary transfer has been acknowledged, the appropriate pending request signal is activated. Masters which perform long burst transfers sample the signal active upon their latency timer expiration and then the read or write bus request pending priority signals. The pending signals indicate the highest priority of all pending requests and all acknowledged transfers in the read pipeline. The write pending request priority signals the highest priority of all pending requests and also acknowledged transfers in the write pipeline queue. If a bursting master determines that a request of equal or higher priority is active or queued in the pipeline, the Master will terminate its data transfer and relinquish the bus.

DESCRIPTION OF DRAWINGS

The invention will be more fully apprehended from the following description of a preferred embodiment, taken in conjunction with an appended drawing, in which.

DESCRIPTION OF PREFERRED EMBODIMENT

An example of a multi-master computer system for overlapped data transfers with decreased latency is described in an IBM publication entitled "Processor Local Bus (PLB) Architecture Specification", Version 4.2, available from IBM corp., Armonk, N.Y. 10504. The PLB supports the capability to broadcast pending master request addresses to bus slaves during the busy state of the data busses which provides for a pipelining of transfers onto the bus. The pipelining allows bus slaves to allocate resources, schedule transfers, or pre-fetch data prior to their respective tenure on the requested data bus whereby bus latency is reduced and overall throughput significantly increased.

Figure 1:
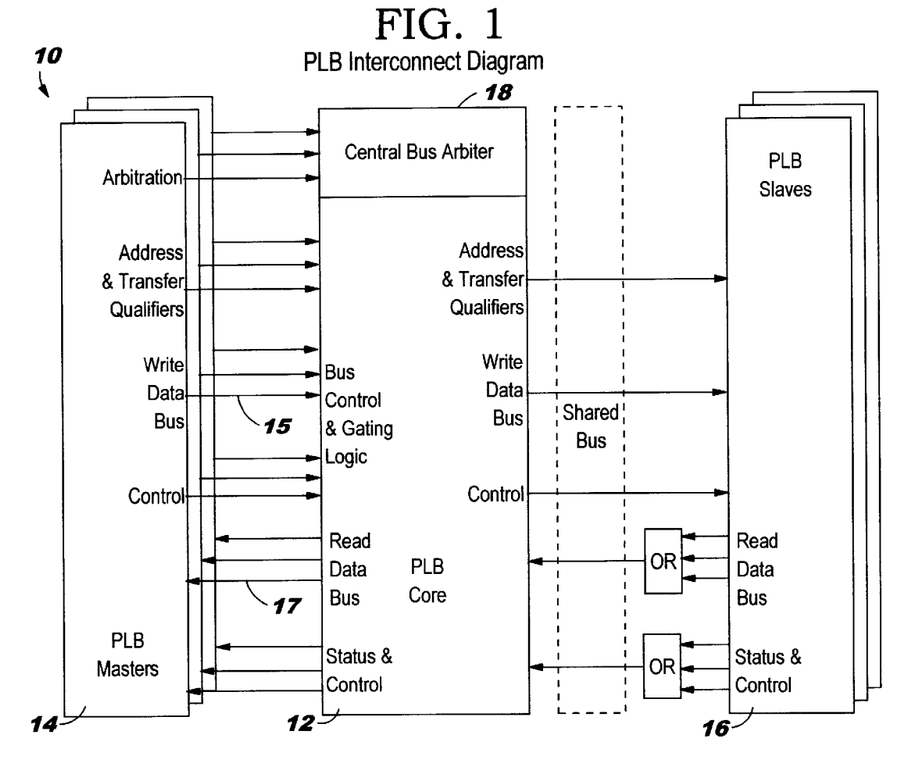
FIG. 1 is a prior art representation of a Processor Local Bus (PLB) Interconnect including an arbiter device for multi—master and slave devices.

FIG. 1 shows a prior art embodiment of a PLB architecture 10 which includes a high performance bus 12 which supports read and write data transfers between a plurality of master devices $14^1 \ldots 14^n$ and slave devices $16^1 \ldots 16^n$. Each PLB master 14 is attached to the bus 12 through separate address and transfer qualifier lines, arbitration lines, read data and write data buses and status/control lines. PLB slaves 16 are attached to the PLB bus through shared, but decoupled, address, read data and write data buses and a plurality of transfer control and status signals for each data bus. Access to the bus is granted through a central bus arbiter 18, which allows masters to compete for bus ownership. The arbiter is flexible enough to provide for the implementation of various priority schemes. The PLB 10 is a fully synchronous bus. Timing for all PLB signals is provided by a single clock source which is shared by all masters and slaves attached to the PLB.

Figure 2:
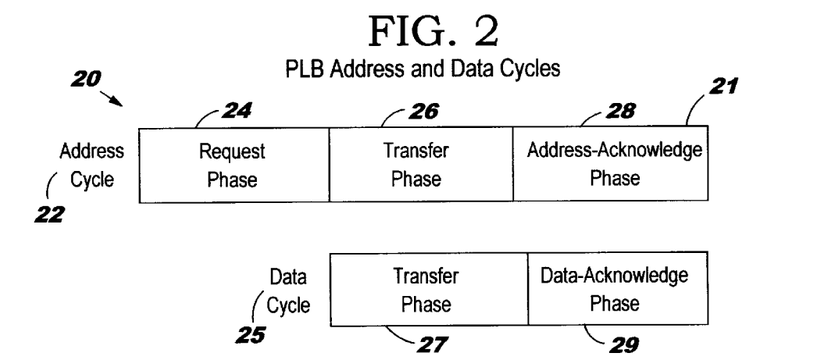
FIG. 2 is a representation of address and data cycles in the PLB of FIG. 1.

FIG. 2 shows a PLB address and data cycle 20. An address cycle 22 has three phases: a request phase 24, a transfer phase 26, and an address acknowledge phase 28. The PLB transaction begins when a master drives its address and transfer qualifier signals and requests ownership of the bus during the request phase of the address cycle. Once the bus ownership has been granted by the PLB arbiter, the master's address and transfer qualifiers are presented to the slave devices during the transfer phase.

During normal operation, the address cycle is terminated by a slave latching the master's address and transfer qualifiers during the address acknowledge phase. The data cycle 25 has two phases: a transfer phase 27 and a data acknowledge phase 29. During the transfer phase, the master will drive a write data bus 15 (see FIG. 1) of write transfers or sample a read data bus 17 (see FIG. 1) for a read transfer. Data acknowledge signals are required during the data acknowledge phase for each data beat in the data cycle.

Figure 3:
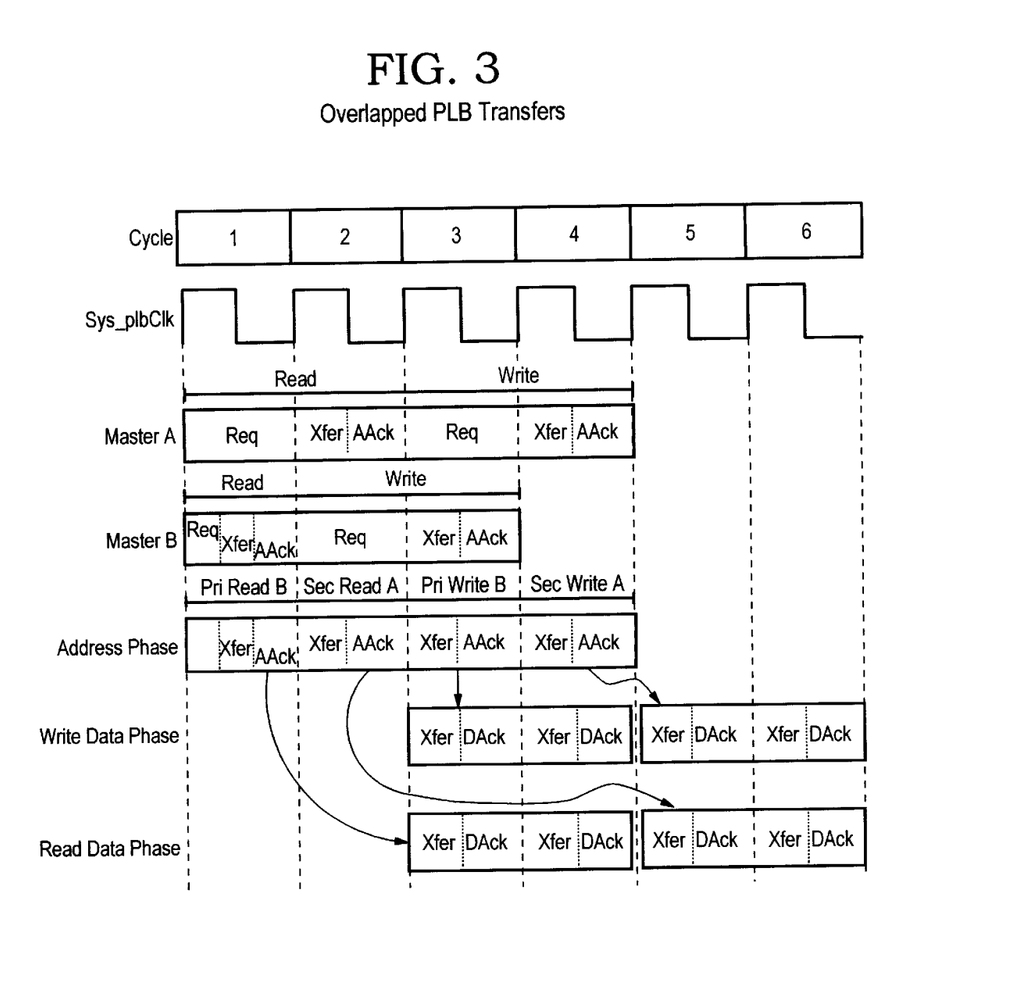
FIG. 3 is a representation of overlapped PLB data transfers in FIG. 1.

FIG. 3 shows an example of overlapped PLB transfers. PLB, address, read data and write data buses are decoupled from one another allowing for address cycles to be overlapped with read or write data cycles and for read data cycles to be overlapped with write data cycles. The cycles, 1 . . . 6, are accompanied by system flux cycles of read and write operations. A master may begin to request ownership of the PLB in parallel with the address cycle and/or a data transfer cycle of another master bus transfer. Overlapped read and write data transfers and split bus transactions allow the PLB to operate at a very high bandwidth. The address phase acknowledges Master B read request in cycle 1 and transferring data in cycle 3. The read acknowledge of Master A is acknowledge in cycle 2 and data transfer is initiated in cycle 5.

Figure 4:
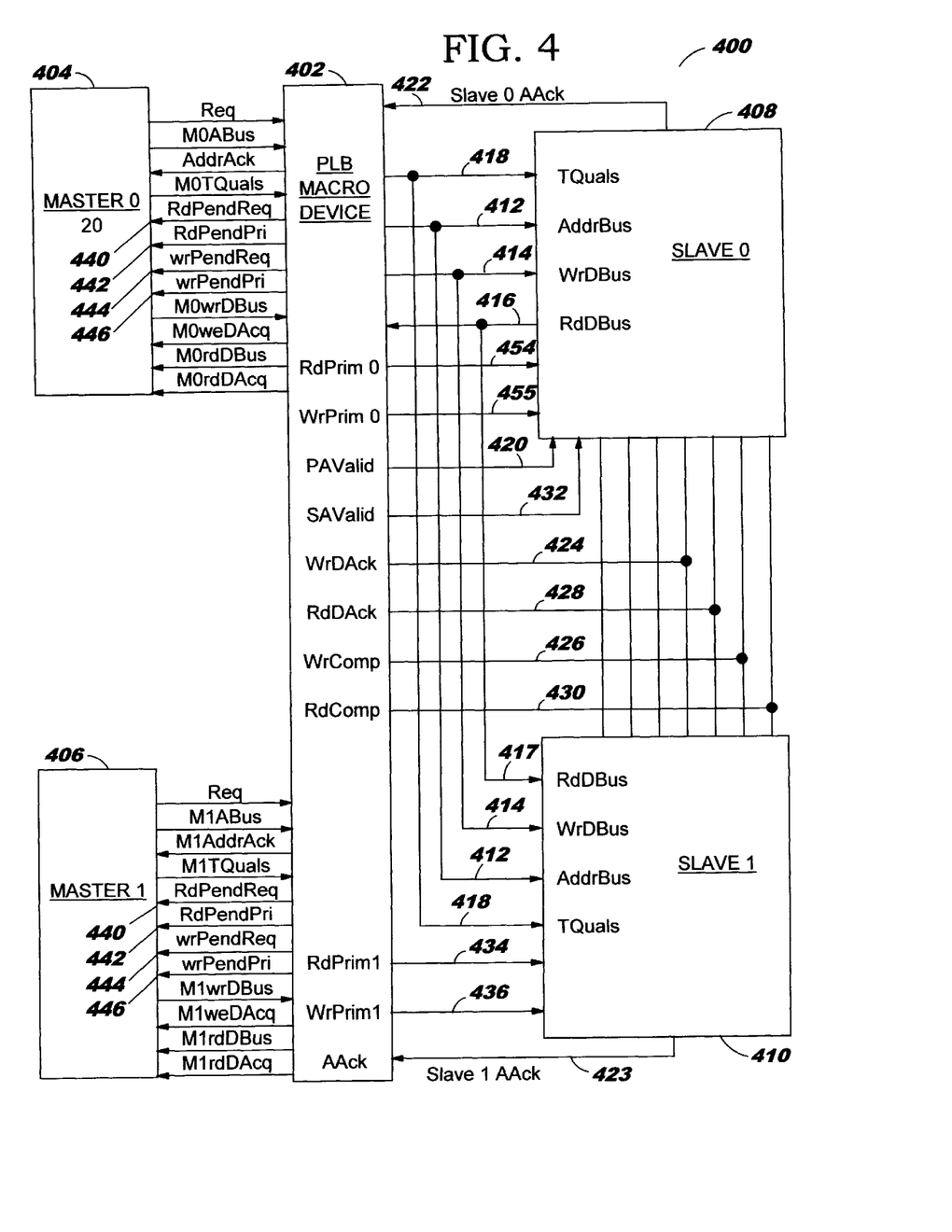
FIG. 4 is a representation of a multi-master and multi-slave computer system including a Local Processor Bus and arbiter servicing multi-master and slave devices with scalable address pipelining of data transfer according to master request priority and incorporating the principles of the present invention.

FIG. 4 shows a PLB architecture with scalable address pipelining implemented. for "N" stages where "N" is any non-zero positive integer. The scalable address PLEBE architecture 400 consists of an arbiter device 402 including address, read and write data busses to which all master devices 404, 406 and slave devices 408, 410 are attached. The arbiter device consists of a central bus arbiter and necessary bus control and gating functions. Each master device is connected to the arbiter device by its own set of buses and control signals. Each master device 404, 406, which are herein referred to as "M0" and "M1", respectively, has a corresponding request line—M0Req and M1Req to the Arbiter 402. The Master function or device asserts the request line to notify the arbiter 402 of a request for a read or write operation. Each Master 404 and 406 has corresponding address buses (M0Abus and M1A bus), write data buses (M0WrD bus and M1WrDbus), read data buses (M0RdDbus and M1RdDbus) and transfer qualifier signal buses (M0TQuals and M1TQuals) connecting the respective Master devices M0 and M1 to the arbiter device 402. The Master functions M0 and M1 transmit the initial address on the address bus (M0ABus and M1ABus) and the transfer qualifiers (M0TQuals and M1TQuals) while the request is asserted and until the master function asserting the request receives an acknowledge signal (M0AddrAck or M1AddrAck) from the arbiter 402. The Master functions 404 and 406 may also transmit write data on the write data bus (M0WrDBus and M1WrDBus) when the request is asserted if the operation requested is a write operation. The Master function 404 and 406 also receive read data acknowledge (M0RdDAck and M1RdDAck) and write data acknowledge signals (M0WrDAck and M1WrDAck) from the Arbiter device 402.

The Slave devices 408 and 410 are interconnected to each other and to the arbiter device 402 by a single AddrBus 412. The Slave devices 408 and 410 are also connected to each other and to the arbiter device by a write data bus (WrDBus) 414 and also a separate read data bus (RdDBus) 416 and 417. The Slave devices 408, 410 also are connected to each other and the arbiter by a Tquals bus 418 which carry a group of signals referred to herein as transfer qualifier signals or "TQuals" providing information regarding a data transfer such as, (a) whether transfer device on the address bus is a read or write function; (b) the size of the transfer; (c) the type of the transfer (e.g., byte; multibyte) (single line or burst); (d) byte enables for the transfer, and other information concerning a particular transfer. A detailed example of a transfer qualifier is provided in commonly assigned patent application Ser. No. 08/731,350 entitled "Method and Apparatus for Control of Speculative Memory Accesses" issued Jul. 20, 1999 as U.S. Pat. No. 5,926,831, the disclosure of which is incorporated herein by reference. Because the transfer qualifier information is provided to the Slave device, multiple cycle transfers may be initiated with a single address, for example, by providing an initial address to a slave device and providing the type of transfer and the number of bytes to be transferred, a block of data may be transferred to or from the Slave device over multiple cycles on the data busses with only a single address placed on the address bus.

The Slave devices 408, 410 are also connected to the Arbiter 402 by a series of control signals. The control signals include a Primary Address Valid Signal (PA Valid) 420. Slave functions 408, 410 also drive an Address Acknowledge Signal (AAck) 422 to the Arbiter when a Slave function receives an address within the range of addresses assigned to the Slave device. The Slave device receiving data from the write data bus (WrDBus) 414 also asserts a Write Data Acknowledge Signal (WrDAck) 424 for each cycle of data properly received by the Slave. In the last cycle of valid data on the write data bus (WrDBus) 414, the Slave function asserts a Write Complete Signal (WrComp) 426 to indicate the completion of the transfer.

In a similar manner, the Slave device places read data on the Read Data Bus (RdDBus) 416, asserts a Read Data Acknowledge Signal (RdDAck) 428 for each cycle of valid data on the Read Data Bus (RdDBus) 416. The Slave function also asserts a Read Complete Signal (RdComp) 430 on the second to last cycle of the transfer. Whether, the Read Complete Signal (RdComp) 430 is asserted on the last cycle or the second to last cycle is dependent upon whether the Slave device is utilizing an early Read Complete Protocol. The Slave device performing a read operation and utilizing an early read complete protocol may signal completion of the operation on the cycle prior to the completion of the read operation. Thus, because of the latency of a read operation, one cycle after receiving an indication to drive data on the Read Bus 416 (RdDBus) which represents the latency period of the Slave device, then the Slave device may indicate completion of the Read Operation one cycle early without the possibility of collision of data on the Read Data Bus.

The PA Valid signal 420 is asserted by the Arbiter 402 to indicate to the Slave devices 408 and 410, herein also referred to as S0 and S1, respectively, that there are valid Primary Address and Transfer Qualifiers on the PLB bus. A Primary Request is one in which there are no data transfers outstanding on the data bus which the request requires. Therefore, after a Slave device asserts an address Acknowledge signal (AAck) 428, in response to a PA Valid signal 420, the Slave device may assert its data acknowledge signal and drive the data bus without regard for any outstanding transfers on the same bus. The data cannot be driven on the Read Data bus (RdDBus) until two cycles following the address acknowledge.

A "Secondary Address Valid" signal (SA Valid) 432 will be asserted by the Arbiter 402 to indicate to the Slaves 408, 410, that there are Secondary Address and Transfer Qualifiers on the PLB bus. A secondary request is one in which the address and transfer qualifiers may be acknowledged by a Slave device, but the Slave is not allowed to utilize the data bus or its associated controls. This allows a Slave device to capture/sample a secondary address and start a second transfer while a primary transfer is in progress. The Slave must continue to wait to assert the Data Acknowledge and Data Bus until the Arbiter indicates that the bus is available by asserting the Read Primary (RdPrim) 434 or Write Primary (WrPrim) 436 signals.

A Read Secondary to Primary Indicator Signal (RdPrim) 434 is asserted by the Arbiter 402 to indicate to the Slaves 408, 410 that a Secondary Transfer on the Read Data Bus 416 which has already been Address Acknowledged may now be considered a "Primary" Transfer on the Read Data Bus. When the Slave asserts the Read Complete Signal 430, to the primary request, the Arbiter 402 will then assert the Read Primary Signal 434 or 454 in the same cycle. The Slave, which acknowledged the secondary transfer, may now assert its first data acknowledge two cycles following the assertion of the Read Primary Signal (RdPrim) 434 in the same cycle. If there is not an acknowledged secondary request on the bus, or the Secondary Request is not currently being acknowledged by a Slave, than the Read Primary Signal (RdPrim) signal 434 or 454 will not be asserted.

A "Write Secondary to Primary Indicator Signal" (WrPrim) 436 or 455 is asserted by the Arbiter 402 to indicate to the Slaves S0, S1, that a Secondary Transfer on the Write Data bus 414, which has already been address acknowledged, may now be considered a primary transfer on the Write Data Bus 414. When the Slave asserts the Write Complete (WrComp) signal 426 for the primary request, the Arbiter will then assert the Write Primary Signal (WrPrim) signal 436 or 455 in the same cycle. The Slave device which acknowledged the secondary transfer may now assert its first data acknowledge in the cycle following the assertion of the Write Primary (WrPrim) Signal 436 or 455. If there's not an acknowledged secondary request on the bus or the Secondary Request is not currently being acknowledged by a Slave, than the Write Primary Signal 436 or 455 will not be asserted.

The disclosed embodiment includes several PLEBE signals for the implementation of the scalable address pipelining function. The arbiter signals include a Read Pending Request (PLB_rdPendReq) 440; a Read Pending Priority (PLB_rdPendPri [0:1])442; a Write Pending Request (PLB_wrPendReq) 444; and a Write Pending Priority (PLB_wrPendPri[0:1])446. A Read Pending Request 440 is a signal asserted by the Arbiter to indicate that a Master has a Read Request Pending on the PLB or a Secondary Read Transfer has been acknowledged and is pending. This signal is combined in a logic OR of all the Master Request inputs for Reads and the secondary read pipeline status. The signal will be combinatorially asserted with requests or asserted the clock cycle after the assertion of the Slave Address Acknowledge for a Secondary Transfer. The signal maybe used by any Master or Slave and can be used by itself or in conjunction with the Read Pending Priority signal 442 to determine when to terminate a variable length read burst transfer. The signal will be negated combinatorially with a negation of a request or in the case of a secondary transfer, the clock cycle following the assertion of the read primary signal 434 or 454.

The Read Pending Priority signals 442 are driven by the Arbiter and are valid anytime the Read Pending Request Signal 440 is asserted. These signals indicate the highest priority of any active Read Request input from all Masters attached to the Arbiter or a pipeline read transfer that has been acknowledged and is pending. The signals used by Masters to determine when to terminate a variable length read burst transfer. Slaves may also use these signals.

The Write Pending Request signal 444 is asserted by the arbiter to indicate that a Master has a Write Request Pending on the bus or a Secondary Write Transfer has been acknowledged and is pending. This signal is a combined logic "OR" of all the Master request inputs for writes and any secondary Writes acknowledged. This signal will be combinatorily asserted with requests or asserted the clock cycle after the assertion of the Slave Address Acknowledge 422 or 423 for a secondary write transfer. This signal may be sampled by any Master or Slave and can be used by itself, or in conjunction with the Write Pending Priority Signal 446 to determine when to terminate a variable length bus transfer. This signal will be negated with the negation of request or in the case of a secondary transfer, the clock cycle following the assertion of the Write Primary Signal 436 or 455.

The Write Pending Priority Signals 446 are asserted by the Arbiter and valid any time the Write Pending Request Signal 444 is asserted. These signal indicate the highest priority of any active write request input from all Masters or a pipeline Write Transfer which has been acknowledged and is pending. These signals may be used by Masters to determine when to terminate a variable length write burst transfer. Slaves may also use these signals.

Figure 5:
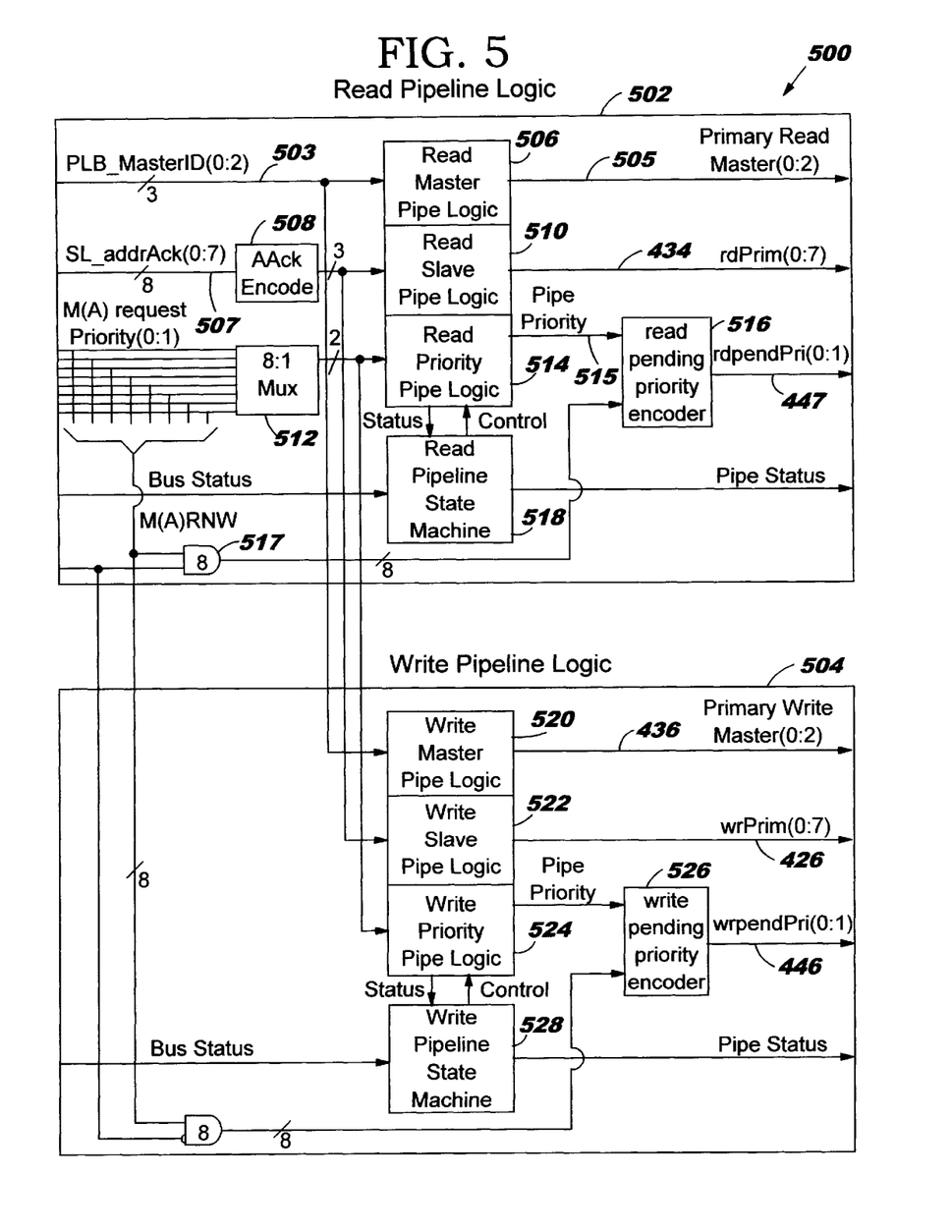
FIG. 5 is a representation of read and write pipeline logic and supporting signals incorporated in the arbiter device of FIG. 4.

FIG. 5 shows Scalable Pipeline Logic 500 in the Arbiter 402 for Multi-Master and Slave Data Transfers with overlapped Read and Write Operations. The scalable pipeline logic includes a Read Pipeline Logic block 502 and a Write Pipeline Logic block 504. The Read and Write Pipeline Logic blocks are essentially symmetrical and only the Read Pipeline Logic block need be described. A Master ID Request signal 503 comprising a 3-bit code identifying the Master is provided to Read Master Pipeline Logic 506 which provides a Primary Read Output Signal 505 from scalable address pipelining logic to be described in conjunction with FIG. 6. A Slave Address Acknowledgement Signal 507 is provided as an 8-bit code to an Acknowledgement Encoder 508 which provides a 3-bit code indicative of the Slave which has asserted its address acknowledge signal and will latch the address and all the transfer qualifiers at the end of the current clock signal. The encoded Slave Address Acknowledge Signal is received by Read Slave Pipe Logic 510 which provides a Read Primary Output Signal 434 or 454 to the Slave Device identified in an 8-bit code. The Read Slave Pipe Logic will be described hereinafter in conjunction with FIG. 7.

Each Master provides a Request Priority Level Code to indicate to the Arbiter the priority of the Master's request and these signals are valid any time a Master Request Signal is asserted. The Arbiter uses these signals in conjunction with the other Masters priority signals to determine which Master Request should be granted and then presented to the Slaves. The Master Priority Codes are: 11 equals highest priority; 10 next highest priority; 01 next highest priority; and 00 lowest priority. A multiplexer 512 selects the priority code of the master which has won an arbitration and provides an input to a Scalable Read Priority Pipe Logic 514 which provides the highest pipeline priority signal to a Read Pending Priority Encoding block 516. The Read Priority Pipe Logic Block 514 will be described hereinafter in conjunction with FIG. 8.

The Master ID signal encoded Slave Id, and priority signals are shifted through the Scalable Read Pipeline Logic by conventional state machines which receive status signals from the pipeline logic and provide control signals for shifting acknowledged secondary transfers signals through the pipeline logic and will be described hereinafter in conjunction with FIGS. 6, 7 and 8.

The Read Pending Priority Encoder 516 receives the highest pipeline priority signal 515 and request prioities for each of the Masters which are banded together in block 517 to yield all current read request priorities and provided as a second input to the encoder 516. The encoder provides the Read Pending Priority Request which indicates the highest priority of any active Read Request input from all Masters attached to the bus or a Pipeline Transfer which has been acknowledged and is pending.

The Write Pipeline Logic Block 504 includes Write Master Pipe Logic 520 which receives the Master ID signal 503 and using Scalable Pipeline Logic provides the Primary Write Id code of the Master requesting service.

A Write Slave Pipe Logic 522 receives the code of the Slave acknowledging the pipeline request for transfer of data and provides a Write Primary Signal 436 or 455which indicates that a Pipeline Write Request may be considered a Primary Write Request in the clock cycle that follows. Slaves supporting address pipelining must begin to sample the WrPrim signal the cycle after the Slave asserts the AAck signal for a Secondary Write Request. In the clock cycle following the assertion of the Arbiter Write Primary, the Arbiter will steer the Secondary Write Data onto the Write Data bus provided the Secondary Write Request has already been acknowledged.

Write Priority Pipe Logic 524 receives the priority of the Master being acknowledged and provides the highest priority of all pipelined Write requests to the Write Pending Priority Encoder 526. The Write Pipeline Logic is controlled by a conventional state machine, which receives status signals from the Pipeline Logic and provides control signals.

The Write Pending Priority Encoder 526 also receives signals from each of the Masters requesting Write transfers and selects the highest priority which is provided as a Write Pending Priority signals 446 to indicate to the bursting Master the highest priority of a Write Request Pending on the bus or a Secondary Write Transfer has been acknowledged and is pending.

Figure 5A:
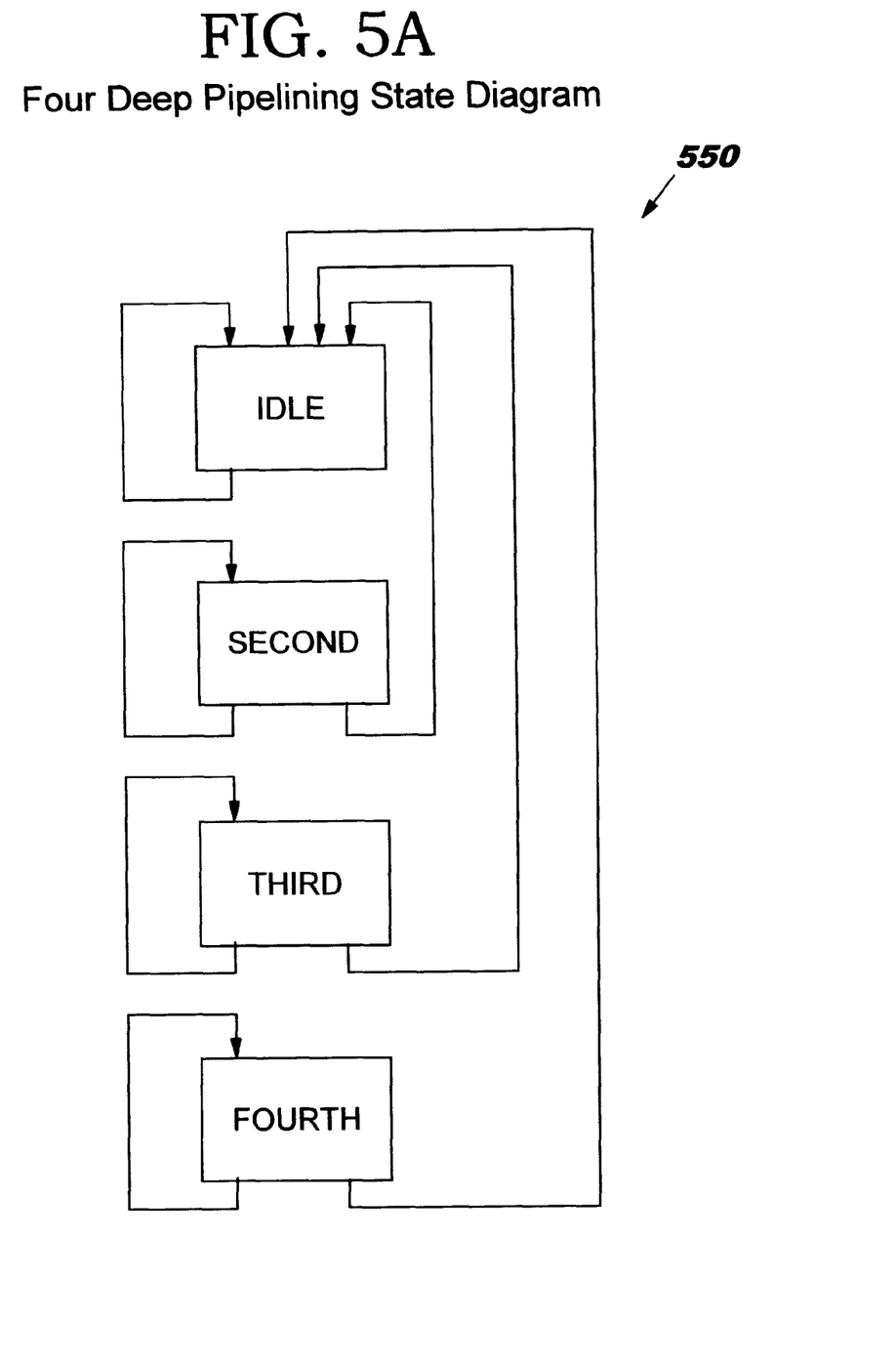
FIG. 5A is a representation of a state machine for controlling the read and write pipeline logic of FIG. 5

FIG. 5A. shows a state diagram of the pipeline control state machine 550 implemented in both the read and write pipelines. In operation, the state machine operates in a similar fashion for both types of data transfer. During a hardware reset the state machine will move from any other active state directly to the IDLE state. After reset when the state machine is in the IDLE state. This indicates no pipelined transfers have been acknowledged. When a secondary transfer is acknowledged by a slave the state machine moves from the IDLE state to the SECOND state. The state machine remains in the SECOND state until either the primary data transfer completes or a subsequent pipelined transfer is acknowledged by a slave. If the primary data transfer completes the state machine moves from the SECOND state back to the IDLE state. If a subsequent pipelined transfer is acknowledged by a slave the state machine moves from the SECOND state to the THIRD state. The state machine remains in the THIRD state until either the primary data transfer completes or a subsequent pipelined transfer is acknowledged by a slave. If the primary data transfer completes the state machine moves from the THIRD state back to the SECOND state. If a subsequent pipelined transfer is acknowledged by a slave the state machine moves from the THIRD state to the FOURTH state. The state machine remains in the FOURTH State until the primary data transfer completes. When the primary data transfer completes the state machine moves from the FOURTH state back to the THIRD state. When the state machine is in the IDLE, SECOND, THIRD, or FOURTH state and the primary data transfer completes in the same clock that a pipelined transfer is acknowledged by a slave no state change occurs.

Figure 6:
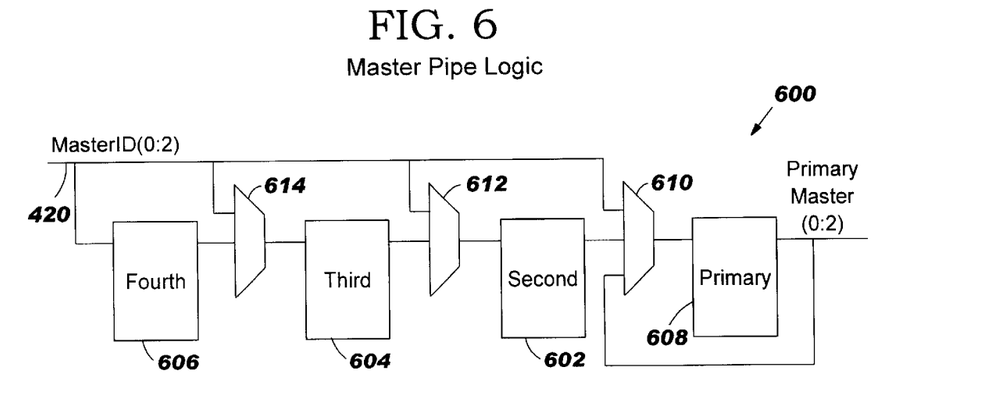
FIG. 6 is a block diagram of scalable master pipeline logic for sequential data transfers between multi-master and slave devices according to master request priority as incorporated in FIG. 5.

FIG. 6 describes the operation of a Scalable Master Pipe Logic 600 which comprises the series connection of standard shift registers 602, 604, 606, . . . 60(n) receiving a Master 3-bit code identifying a Master which is requesting a data transfer. Each Master request for data is stored as identification in a shift register. A Primary Request is loaded in a Primary Stage 608. As additional requests are address acknowledged, they are stored in stages 602, 604, and 606. Multiplexers 610, 612, 614 allow the current Master ID to be loaded into the appropriate stage register. The Shift Register Logic acts as a FIFO and when the Primary Transfer Completes, the logic advances the next MasterID in the pipeline to the Primary Register. The Pipeline State Machine 550, shown in FIG. 5 controls the loading and shifting of Master IDs in the logic. Each time the pipeline logic advances, Multiplexers 610, 612, 614 select the Id stored in the preceding Register stage, which is then lached into the next stage. The Multiplexer 610 also receives a feedback signal from the Master Primary Signal, which allows the Primary Shift Register 608 to be continuously clocked throughout a primary data transfer with a secondary address tenure in progress.

Figure 7:
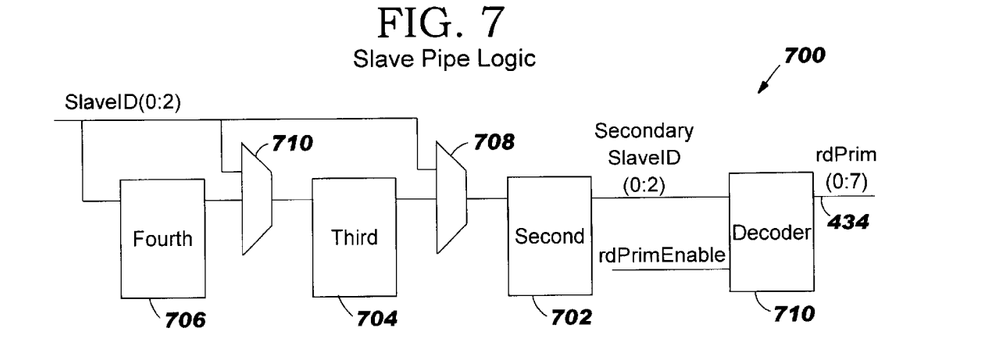
FIG. 7 is a block diagram of scalable slave pipeline logic for sequential data transfers of slave devices to master devices as incorporated in FIG. 5.

In FIG. 7, Slave Pipe Logic 700 comprises sequential shift registers 702, 704 and 706. When a Slave acknowledges a secondary, non-primary transfer, binary encoded value indicative of the Slave ID is loaded in register 702. Successive Slave Acknowledgements of pipelined transfers cause Shift Register Stage 704 to be loaded, followed by the fourth stage 706 to be loaded. The output of the secondary stage 702 is provided as an input to 8-bit Decoder 710 which selects which Slave will have its Read 20 Primary Control Signal 434 or 454 asserted upon completion of the current Primary Data Transfer. The Decoder 710 converts the 3-bit signal defining the Slave device to an 8-bit address identifying the Slave device. The Decoder 710 is enabled by a Read Primary Enable Signal under the control of the arbiter when a pipeline transfer has been acknowledged and is present in the pipeline and the slave asserts the read complete signal for the primary read transfer. The Slave logic acts as a FIFO and when the Primary Transfer Completes, the logic behaves as a shift register and advances the next Slave in the pipeline to the Secondary Register.

Figure 8:
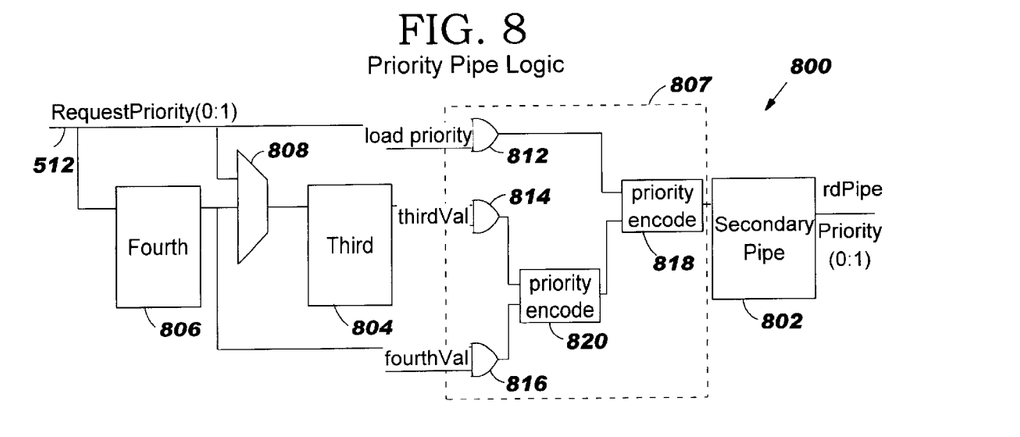
FIG. 8 is a block diagram of priority logic for the arbiter device as incorporated in FIG. 5, the logic continuously providing information to all masters as to the highest pending read and write request and to slaves for latching the read or write busses for data transfers.

In FIG. 8, the Priority Pipe Logic 800 includes a Secondary Register 802 sequentially linked to a third shift register 804, and a fourth shift register 806. A multiplexer and selectable priority resolution circuit 807 coupled to the secondary register and receiving input signals from the third and fourth stages and the Request Priority signal for loading the secondary register. The circuit 807 comprises gating circuits 812, 814, 816 and priority encoders 818 and 820. The encoded current Request Priority Signal 512 is provided to each of the stages. A Multiplexer 808 responsive to the Priority Signal and the signal stored in the fourth stage selects the fourth or current load priority for input to the third stage 804. The enabling gate circuit 812 is responsive to the state machine load signal for a Secondary, Non-Primary, Transfer. The output of the gating signals are provided to Priority Encoders 818 and 820 which selects the Highest Priority Slave device currently being loaded or resident in registers 804 or 806. In operation, secondary register 802 is loaded, then the register 804 is loaded, and finally, the register 806 is loaded with the request prioirity of the Master for the pipelined request. When a secondary address acknowledge occurs, the pipelined Master Request Priority is automatically loaded into the second register. When a third Slave Acknowledge occurs, the current pipelined Master request priority is loaded into the third register. Concurrently, the output of the secondary register 802 is compared to the current Master Request Priority and if the current pipelined Master Request Priority is greater, than it is also loaded into the Secondary Request Priority Register 802. When a fourth Acknowledge occurs, the current Master Priority is loaded into the register 806. Concurrently, the output of the second and third Registers are compared to the current Master Request Priority and if the current Master Request Priority is greater than both the second and third registers it is also loaded into the Secondary Register. This method of loading the Priority Pipe Logic ensures that as the pipeline is loaded, the Read Pipe Priority Output reflects the Highest Priority Master Request Acknowledge in the pipeline. The pipeline 800 acts as a FIFO and when the Primary Transfer Completes, the logic behaves similar to a shift register. However, each time as the pipe advances or shifts, a Priority Comparison is made to load the Highest Priority Value of either the third or fourth register into the second register 802. Also, conditions could exist which a shift and load operation could occur simultaneously. In this situation, the contents of the third register are compared to the current Master Request Priority and the highest priority of the two is loaded into the second register. The sequence and control of the logic is handled by the Read Pipeline State Machine.

While the pipelining of requests has been described for 4 deep requests, the pipeline logic is extendable to "N" deep data transfer requests.

The processor local bus 400 supports unlimited independent pipelining of each data bus. In order to support such pipelining, the Arbiter is required to track the Master and Slaves which are involved in a particular pipeline transfer and ensure the proper slave is notified when a previously acknowledged pipeline transfer is considered primary. The Arbiter is also responsible for steering the slave response to the correct Master. The Arbiter is also required to provide the highest priority pending Read and Write request in the acknowledged pipelines.

To achieve this operation, the Arbiter must sample each Slave address acknowledge signal independently up to the number of Slaves supported. The Arbiter must also provide a separate rdPrim and wrPrim to each Slave to notify one, and only one, Slave that its is position in the pipeline has been promoted to the primary transfer. The mechanism for broadcasting all pipelined transfers is via the SA Valid signal. For a particular type of transfer, Read or Write, each subsequent assertion of the SA Valid signal by the Arbiter without an intervening Primary PA Valid assertion is considered an increase in the depth of pipelining.

From a Master viewpoint, the Master is unaware that any pipelining is occurring at all. The Master receives a Master Address Acknowledge signal and awaits the appropriate data acknowledge. From a Slave standpoint, the Slave acknowledges a pipeline transfer without concern for its position in the pipeline. Further, the Master may require additional pipelined requests for the same bus as long as the Master continues to receive the Master Address Acknowledge Assertion. The Slave may or may not acknowledge subsequent assertions of the SA Valid signal to claim as many pipeline transfers as possible. In general, since there is no bus timeout for pipeline transfers, Slaves which cannot acknowledge a secondary request in a reasonable amount of time, should assert a Slave Rearbitrate (S1_rearbitrate) signal to allow the Arbiter to advance to the next pending bus request.

Figure 9:
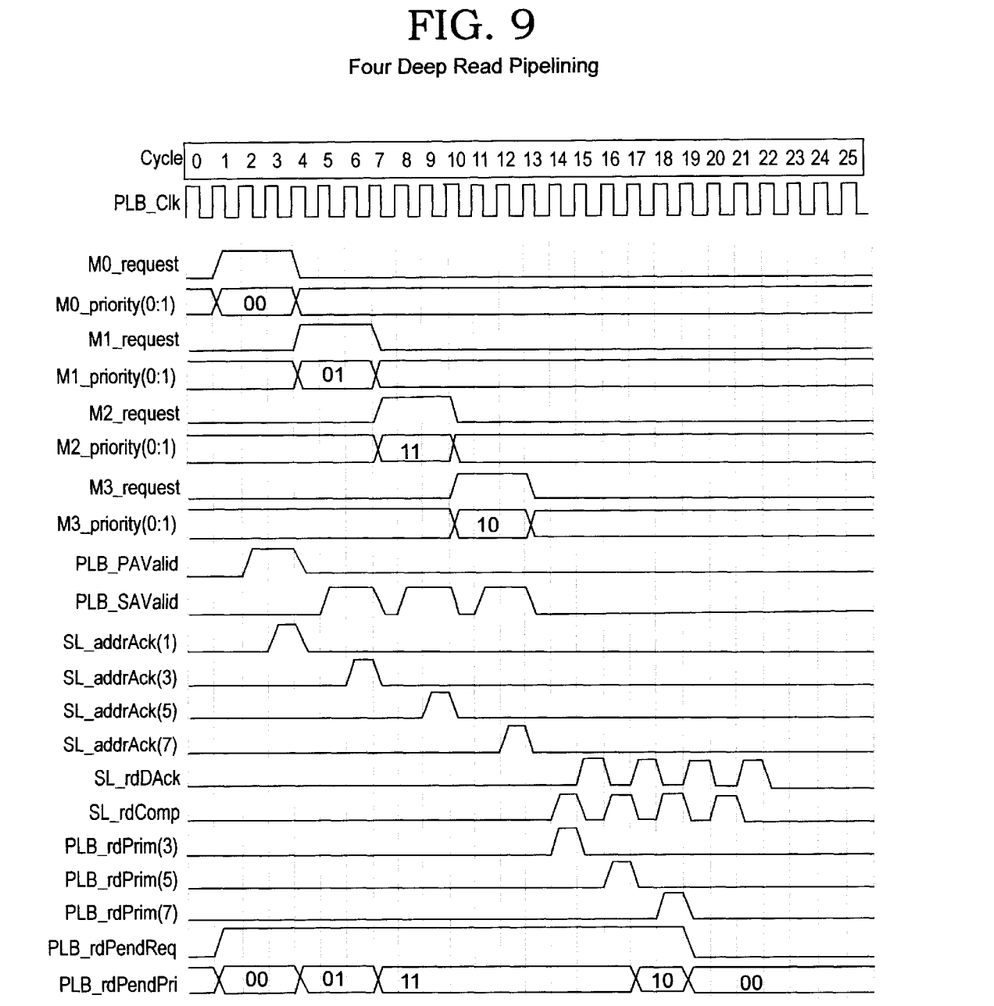
FIG. 9 is a timing diagram for four deep read pipelining of master requests in the system of FIGS. 4–8.

While the pipelining of data requests has been described for four (4) stages, the logic many be extended to handle "N" stages where "N" is any integer FIG. 9 shows a timing diagram for 4-deep Read Pipelining, one primary and three pipeline, by 4 different Masters Read Requests. Different Slaves acknowledge each transfer request. The Arbiter samples all Slave Address Acknowledge signals. Independent Read Primary signals are generated to the appropriate Slave to notify them they are now the primary transfer slave and may drive the data bus and Read Data Acknowledge Signal. The Arbiter generates the pending priority of the highest request priority of the current or pipeline Master.

A read Transfer is requested by a Master device, M0, by asserting a request signal in cycles 1, 2, and 3. In the same cycles, 1–3, the Master M0 indicates to the Arbiter, the Request Priority Code 00 of the Master's Request, the code representing the lowest priority for a given request. In response, the Arbiter asserts the Read Pending Request signal, rdPendReq, and also the Read Pending Priority signals to the value of Master 0's request priority in clock 1. The arbiter subsequently in clock 2 asserts the PA Valid signal to the Slave devices since the read bus is idle in this example. The Slave devices then decode the addresses presented on the address bus and the addressed Slave device then asserts a Slave Address Acknowledge signal to indicate that it has latched the address bus and transfer qualifiers and no longer requires the use of the Address bus and transfer qualifiers. Since the M0 request is a Primary request, i.e., the primary address valid signal was asserted, the Slave device that acknowledged the request may immediately drive the Read Data bus.

In cycles 4, 5, 6 the Master device M1 asserts a request signal, a request priority signal 01 to indicate to the Arbiter the priority of the M1 request. The priority level 01 is the second next highest priority level of the Read bus. In response, the Arbiter asserts the Read Pending Request signal, rdPendReq, and also the Read Pending Priority signals to the value of Master 1's request priority in clock 4. Since the Read data bus is busy performing the first transfer in response to the M0 request, the Arbiter considers this second read transfer to be a "Secondary" request and asserts the SA Valid signal in response to the Master's request. Only Slave devices which support the address pipelining function will receive the SA Valid signal and when asserted will decode the address bus and transfer qualifier signals and assert Address Acknowledge to indicate the Addressed Slave, slave 3, has latched the Address bus and transfer qualifier signals and no longer requires the use of the Address bus and transfer qualifiers. Thus, in cycles 5 and 6 the SA Valid signal is asserted and the Slave Address Acknowledge (S1_addrAck(3)) signal is asserted to acknowledge the second request and that will prefetch the Read data requested but, will not drive the Read Data Acknowledge or the Read Data bus signals until the Primary Transfer of data has been completed.

In cycles 7, 8, 9 a third request, M2_request, is asserted along with the 11 priority code indicating the highest priority for data transfer. In response, the Arbiter updates the Read Pending Priority signals to the value of Master 2's request priority in clock 7 because it is a higher priority than all acknowledged transfers in the read pipeline, 01 in this case. The arbiter asserts the SA Valid signal in response to this request and slave 5 address acknowledges this transfer.

In cycles 10, 11, and 12, the Master Request, M3_request, is asserted along with the Priority code 10. No updates to the Read Pending Priority signals occurs in this case because 10 is a lower priority than the previously acknowledged 11 priority already resident in the read pipeline. The arbiter asserts the SA Valid signal in response to this request and slave 7 address acknowledges this transfer.

The primary data transfer tenure for Master 0 continues until the final data acknowledge of the transfer, which in this case is the initial data acknowledge asserted in clock 15. One clock cycle prior to asserting the final read data acknowledge signal, S1_rdDAck, slave 1 asserts the read complete signal, S1_rdComp in clock 14. The assertion of the read complete signal indicates to the arbiter that the slave will deliver the final data acknowledge in the next clock cycle. The arbiter uses the read complete signal to coincidentally assert the Read Primary signal to the next slave in the read pipeline, slave 3 in this case, to alert it that it is being elevated to primary data bus status and that it may begin providing read data two clock cycles following the assertion of the slave Read Primary signal. This coincides with the clock following the last read data acknowledge of the preceding primary read data transfer.

Slave 3 asserts the read complete signal, S1_rdComp in clock 16, one clock cycle prior to asserting the final read data acknowledge signal for Master 1's read data transfer in clock 17. The arbiter uses the read complete signal to coincidentally assert the Read Primary signal to the next slave in the read pipeline, slave 5 in this case, to alert it that it is being elevated to primary data bus status and that it may begin providing read data two clock cycles following the assertion of the slave Read Primary signal. The assertion of the read primary signal for Master 1's transfer implies that Master 2 will imminently become the primary read data bus owner. Thus its latched priority, which is the highest priority of 11, is no longer pending and is overwritten with the next highest priority in the read pipeline. In this case it is 10 or the priority of Master 3's previously acknowledged read.

Slave 5 asserts the read complete signal, S1_rdComp in clock 18, one clock cycle prior to asserting the final read data acknowledge signal for Master 2's read data transfer in clock 19. The arbiter uses the read complete signal to coincidentally assert the Read Primary signal to the next slave in the read pipeline, slave 7 in this case, to alert it that it is being elevated to primary data bus status and that it may begin providing read data two clock cycles following the assertion of the slave Read Primary signal. The assertion of the read primary signal for Master 2's transfer implies that Master 3 will imminently become the primary read data bus owner and thus its latched priority, which is the highest priority of 10, is no longer pending and is overwritten with 00 the lowest priority and the Read Pending Request signal is deasserted as the read pipeline is now empty.

Slave 7 asserts the read complete signal to the arbiter in clock 20 to indicate is will assert the final, an only, read data acknowledge the master in the next clock cycle. Slave 7 asserts the read data acknowledge signal to the master in clock 21 completing the sequence of pipelined read transfers.

Figure 10:
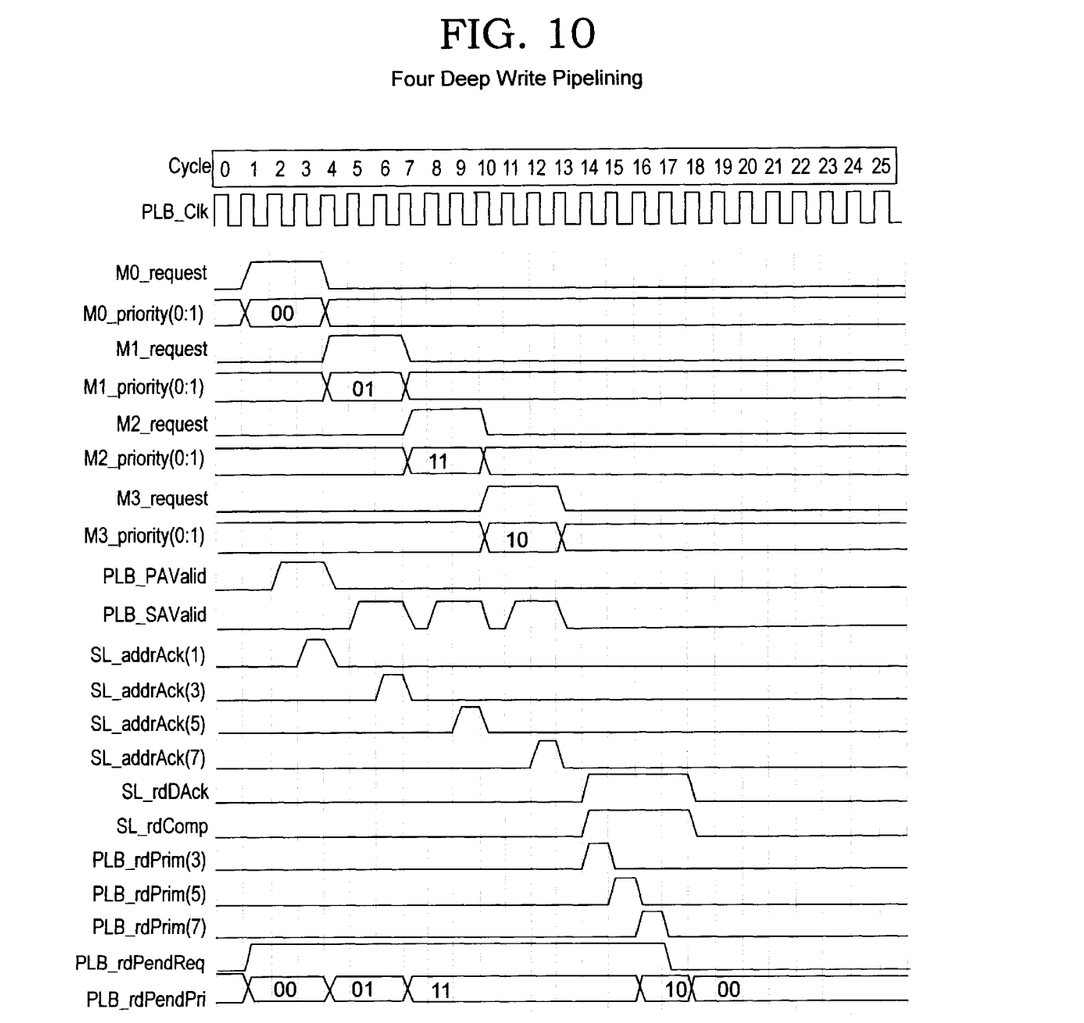
FIG. 10 is a timing diagram for four deep write pipelining of master requests in the system of FIGS. 4–8.

FIG. 10 shows a timing diagram for 4-deep Write Pipelining, one primary and three pipeline, by 4 different Masters Write Requests. Different Slaves acknowledge each transfer request. The Arbiter samples all Slave Address Acknowledge signals. Independent Write Primary signals are generated to the appropriate Slaves to notify them they are now the primary transfer slave and may latch the data bus and assert the Write Data Acknowledge Signal. The Arbiter generates the pending priority of the highest request priority of the current or pipelined Master.

A write Transfer is requested by a Master device, M0, by asserting a request signal in cycles 1, 2, and 3. In the same cycles, 1–3, the Master M0 indicates to the Arbiter, the Request Priority Code 00 of the Master's Request, the code representing the lowest priority for a given request. In response, the Arbiter asserts the Write Pending Request signal, wrPendReq, and also the Write Pending Priority signals to the value of Master 0's request priority in clock 1. The arbiter subsequently in clock 2 asserts the PA Valid signal to the Slave devices since the write bus is idle in this example. The Slave devices then decode the address presented on the address bus and the addressed Slave device then asserts a Slave Address Acknowledge signal to indicate that it has latched the address bus and transfer qualifiers and no longer requires the use of the Address bus and transfer qualifiers. Since the M0 request is a Primary request, i.e., the primary address valid signal was asserted, the Slave device that acknowledged the request may immediately latch the Write Data bus.

In cycles 4, 5, 6 the Master device M1 asserts a request signal, a request priority signal 01 to indicate to the Arbiter the priority of the M1 request. The priority level 01 is the second next highest priority level of the write bus. In response, the Arbiter asserts the Write Pending Request signal, wrPendReq, and also the Write Pending Priority signals to the value of Master 1's request priority in clock 4. Since the write data bus is busy performing the first transfer in response to the M0 request, the Arbiter considers this second read transfer to be a "Secondary" request and asserts the SA Valid signal in response to the Master's request. Only Slave devices which support the address pipelining function will receive the SA Valid signal. When asserted the slaves will decode the address bus and transfer qualifier signals and assert Address Acknowledge to indicate the Addressed Slave, slave 3, has latched the Address bus and transfer qualifier signals and no longer require the use of the Address bus and transfer qualifiers. Thus, in cycles 5 and 6 the SA Valid signal is asserted and the Slave Address Acknowledge (S1_addrAck(3)) signal is asserted to acknowledge the second request and that it will not assert the Write Data Acknowledge signal or latch the Write Data bus signals until the Primary Transfer of data has been completed.

In cycles 7, 8, 9 a third request, M2_request, is asserted along with the 11 priority code indicating the highest priority for data transfer. In response, the Arbiter updates the Write Pending Priority signals to the value of Master 2's request priority in clock 7 because it is a higher priority than all acknowledged transfers in the write pipeline, 01 in this case. The arbiter asserts the SA Valid signal in response to this request and slave 5 address acknowledges this transfer.

In cycles 10, 11, and 12, the Master Request, M3_request, is asserted along with the Priority code 10. No updates to the Write Pending Priority signals occurs in this case because 10 is a lower priority than the previously acknowledged 11 priority already resident in the write pipeline. The arbiter asserts the SA Valid signal in response to this request and slave 7 address acknowledges this transfer.

The primary data transfer tenure for Master 0 continues until the final data acknowledge of the transfer, which in this case is the initial data acknowledge asserted in clock 14. Coincident with the assertion of the write data acknowledge signal, S1_wrDAck, slave 1 asserts the write complete signal, S1_wrComp in clock 14. The assertion of the write complete signal indicates to the arbiter that the slave is asserting the final, in this case only, data acknowledge of the write transfer. The arbiter uses the write complete signal to coincidentally assert the Write Primary signal to the next slave in the write pipeline, slave 3 in this case, to alert it that it is being elevated to primary data bus status. Thereafter, slave 3 may begin latching write data in the clock cycle following the assertion of the slave Write Primary signal. This coincides with the clock following the last write data acknowledge of the preceding primary write data transfer.

Slave 3 asserts the write complete signal, S1_wr Comp in clock 15, coincident with asserting the final write data acknowledge signal for Master 1's write data transfer. The arbiter uses the write complete signal to coincidentally assert the Write Primary signal to the next slave in the write pipeline, slave 5. In this case, slave 5 is alerted that it is being elevated to primary data bus status and that it may begin latching write data the clock cycle following the assertion of the slave Write Primary signal. The assertion of the write primary signal for Master 1's transfer implies that Master 2 will imminently become the primary write data bus owner. Thus, its latched priority, which is the highest priority of 11, is no longer pending and is overwritten with the next highest priority in the write pipeline. In this case it is 10 or the priority of Master 3's previously acknowledged write.

Slave 5 asserts the write complete signal, S1_wrComp in clock 16, coincident with the assertion of the final write data acknowledge signal for Master 2's write data transfer. The arbiter uses the write complete signal to coincidentally assert the Write Primary signal to the next slave in the write pipeline, slave 7. In this case, slave 7 is alerted that it is being elevated to primary data bus status and that it may begin latching write data the clock cycle following the assertion of the slave Write Primary signal. The assertion of the write primary signal for Master 2's transfer implies that Master 3 will imminently become the primary write data bus owner. Thus its latched priority, which is the highest priority of 10, is no longer pending and is overwritten with 00 the lowest priority. The Write Pending Request signal is deasserted as the write pipeline is now empty.

Slave 7 asserts the write complete signal to the arbiter in clock 17 to indicate it is asserting the final, and only, write data acknowledge to the master in the current clock cycle. This completes the sequence of pipelined write transfers.

While the invention has been described in conjunction with a specific embodiment, various changes can be made without departing from the spirit and scope of the invention as defined in the appended claims:

We claim:

1. A data transfer system with overlapped read and write operations and scalable address pipelining, comprising:
    a data bus including an address bus, a read bus, and a write bus;
    at least one master device coupled to separate address, read data and write data buses;
    at least one slave device attached to the local bus through shared, but decoupled address, read and write data buses;
    an arbiter apparatus coupled to the local bus, the arbiter allowing masters to compete for bus ownership; and
    scalable logic which programs address pipelining up to "N" deep master requests where "N" is any positive non-zero integer.

2. The system of claim 1 further comprising:
    a read or write master pipeline logic implementing scalable pipeline logic in the arbiter for pipelining data transfers.

3. The system of claim 1 wherein the read or write master pipeline logic comprises:
    a series connection of shift register stages for receiving successive master requests for data transfer; and
    multiplexers between shift register stages receiving an input from a preceding stage and a master request to select the signal for transfer to the next succeeding stage.

4. The system of claim 1 further comprising:
    a read or write slave pipeline logic implementing scalable pipeline logic in the arbiter for pipelining data transfers.

5. The system of claim 4 wherein the read or write slave pipeline logic comprises:
    a series connection of shift register stages for receiving successive slave requests for data transfer;
    multiplexers between shift register stages receiving an input from a preceding stage and a slave acknowledge to select the signal for transfer to the next succeeding stage; and
    a decoder converting a slave identifying signal to an address identifying the slave.

6. The system of claim 1 further comprising:
    a read or write priority pipeline logic prioritizing scalable pipeline logic in the arbiter for pipelining data transfers.

7. The system of claim 6 wherein the read or write priority logic comprises:
    a secondary register sequentially linked to a third shift register stage and a fourth shift register stage, each stage receiving a Request Priority signal; and
    a multiplexer and selectable priority resolution circuit coupled to the secondary register and receiving input signals from the third and fourth stages and the Request Priority signal for loading the secondary register.

8. The system of claim 1 further comprising:
    arbiter signal generation apparatus which generates signals for implementing scalable address pipelining.

9. The system of claim 8 wherein the signal generation apparatus generates a read pending request signal to indicate that a master or slave has a read request pending on the data bus or a secondary read transfer has been acknowledged and is pending.

10. The system of claim 8 wherein the signal generation apparatus generates a read pending priority signal to indicate the highest priority of any active read request of a master or slave.

11. The system of claim 8 wherein the signal generation apparatus generates a write pending request signal to indicate any active write request on the bus from all masters.

12. The system of claim 9 wherein the signal generation apparatus generates a write pending priority signal to indicate the highest priority of any active write request from all masters or slaves.

13. The system of claim 1 further comprising:
    arbiter tracking apparatus which tracks the master and slave involved in each pipeline transfer to broadcast and acknowledge.

14. The system of claim 1 further comprising:
    arbiter notifying apparatus which notifies the proper slave that its pipeline transfer is considered primary and that the slave may latch or drive the data bus depending on whether a drived or latch operation is pipelined.

15. The system of claim 1 further comprising:

arbiter information apparatus which provides information to all bus masters as to the highest priority pending read request and write request in an acknowledged pipeline queue.

16. A method of data transfer in a multi-computer system with overlapped read and write operations and scalable address pipelining, comprising:

generating signals for address, read and write transfers across a data bus;

loading and shifting of master request in a master pipeline logic;

loading and shifting an acknowledgement of a data request in a slave pipeline logic;

advancing the next slave in the pipeline upon completion of a primary data transfer;

recording the transfer of data in an arbiter pipeline logic;

loading the highest priority value in the priority pipeline logic for execution by a master device or slave device as the case may be; and programmably changing the the depth of address pipelining independently on the overlapped read and write data busses.

17. The method of claim 16 further comprising:

generating a read pending request signal to indicate that a master has a read request pending on the data bus or a secondary read transfer has been acknowledged and is pending.

18. The method of claim 16 further comprising:

generating a read pending priority signal to indicate the highest priority of any active read request of a master.

19. The method of claim 16 further comprising:

generating a write pending request signal to indicate the highest priority of any active write request on the data bus from all masters or slaves.

20. The method of claim 16 further comprising:

generating a write pending priority signal to indicate the highest priority of any active write request from all masters or a secondary write request has been acknowledged and is pending.

21. The method of claim 16 further comprising:

tracking the master and slave involved in each pipeline transfer to ensure that the transfers were broadcast and acknowledged.

22. The method of claim 16 further comprising:

notifying the proper slave that its pipeline transfer is considered primary and that the slave may latch or drive the data bus depending on whether a drive or latch operation is pipelined.

23. The method of claim 16 further comprising:

providing information to all bus masters as to the highest priority pending read request and write request in an acknowledged pipeline queue.

24. The method of claim 16 further comprising:

generating signals for implementing scalable address pipelining.

25. A program medium, executable in a computer system for data transfers in a multi-computer system with overlapped read and write operations and scalable address pipelining, comprising:

program instructions generating signals for address, read and write transfers across a data bus;

program instructions loading and shifting of master request in a master pipeline logic;

program instructions loading and shifting an acknowledgement of a data request in a slave pipeline logic;

program instructions advancing the next slave in the pipeline upon completion of a primary data transfer;

program instructions recording the transfer of data in an arbiter pipeline logic;

program instructions loading the highest priority value in the priority pipeline logic for execution by a master device; and program instructions programmably changing the depth of address pipelining independently on the overlapped read and write data busses.

26. The medium of claim 25 further comprising:

program instructions generating a read pending request signal to indicate that a master or slave has a read request pending on the data bus or a secondary read transfer has been acknowledged and is pending.

27. The medium of claim 25 further comprising:

program instructions programmably changing the depth of address pipelining independently on the overlapped read and write data busses.

28. The medium of claim 25 further comprising:

program instructions generating a read pending priority signal to indicate the highest priority of any active read request of a master or slave.

29. The medium of claim 25 further comprising:

program instructions generating a write pending request signal to indicate the highest priority of any active write request on the data bus from all masters.

30. The medium of claim 25 further comprising:

program instructions generating a write pending priority signal to indicate the highest priority of any active write request from all masters.

31. The medium of claim 25 further comprising:

program instructions tracking the master and slave involved in each pipeline transfer to ensure that the transfers were broadcast and acknowledged.

32. The medium of claim 25 further comprising:

program instructions notifying the proper slave that its pipeline transfer is considered primary and that the slave may latch or drive the data bus depending on whether a drive or latch operation is pipelined.

33. The medium of claim 25 further comprising:

program instructions providing information to all bus masters as to the highest priority pending read request and write request in an acknowledged pipeline queue.

34. The medium of claim 25 further comprising:

program instructions generating signals for implementing scalable address pipelining.

* * * * *